(12) United States Patent
Puempel et al.

(10) Patent No.: US 6,571,978 B1
(45) Date of Patent: Jun. 3, 2003

(54) FUEL TANK SYSTEM FOR A MOTOR VEHICLE

(75) Inventors: Andreas G. R. Puempel, Essex; Luigi Savoni, La Salle, both of (CA); Ulrich Karsch, Niederkassel (DE); Jürgen Runkel; Dirk Eulitz, both of Bonn (DE); Klaus Esser, Königswinter (DE)

(73) Assignee: Kautex Textron GmbH & Co. KG., Bonn (DE)

( * ) Notice: Subject to any disclaimer, the term of this patent is extended or adjusted under 35 U.S.C. 154(b) by 0 days.

(21) Appl. No.: 09/430,809

(22) Filed: Oct. 29, 1999

(30) Foreign Application Priority Data

Oct. 29, 1998 (DE) .......................................... 198 49 820

(51) Int. Cl.⁷ ................................................ B60P 3/00
(52) U.S. Cl. ........................ 220/562; 220/563; 220/564
(58) Field of Search ............................ 220/4.13, 4.14, 220/4.15, 4.12, 501, 506, 581, 582, 586, 592, 521, 523, 526, 527, 254, 256, 626, 627, 562–564

(56) References Cited

U.S. PATENT DOCUMENTS 2,781,944 A * 2/1957 Clute ...................... 220/527 X
5,129,544 A * 7/1992 Jacobson et al. ........... 220/562
5,408,977 A   4/1995 Cotton
5,732,684 A * 3/1998 Thompson .................. 123/514
5,931,335 A * 8/1999 Cippitani ................ 220/562 X
5,975,331 A * 11/1999 Ishikawa .................... 220/564
6,113,820 A * 9/2000 Lyzinski et al. .......... 264/36.15

FOREIGN PATENT DOCUMENTS

| DE | 3600177 |      | 7/1986  |
|----|---------|------|---------|
| DE | 4304180 | A1   | 2/1993  |
| DE | 4142016 |      | 6/1993  |
| DE | 4429875 | A1   | 8/1994  |
| EP | 0799738 |      | 10/1997 |

* cited by examiner

*Primary Examiner*—Stephen K. Cronin
*Assistant Examiner*—Maerena W. Brevard
(74) *Attorney, Agent, or Firm*—Drinker Biddle & Reath LLP

(57) ABSTRACT

A tank system for a motor vehicle is provided with at least one fuel tank, at least one connection, connecting conduit, or opening which is provided in the tank wall and which is closed by a closure, or at least one passage through the tank wall or through a closure. At least one cover is gas-tightly mounted on the outside to at least one region of the tank. The cover with the tank wall defines a space which is closed off with respect to the ambient atmosphere and within which is arranged the at least one connection, connecting conduit, opening, or passage.

18 Claims, 3 Drawing Sheets

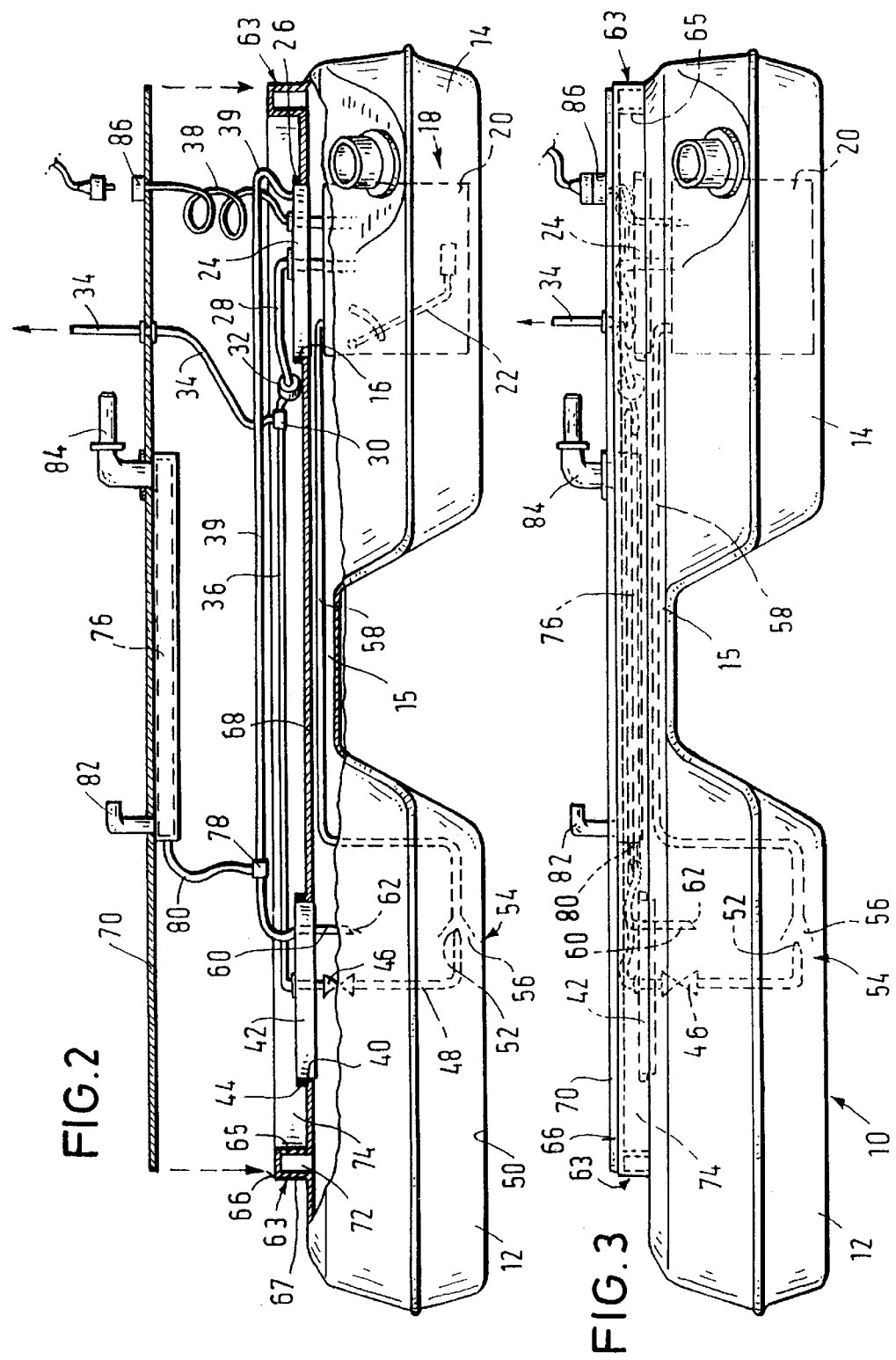

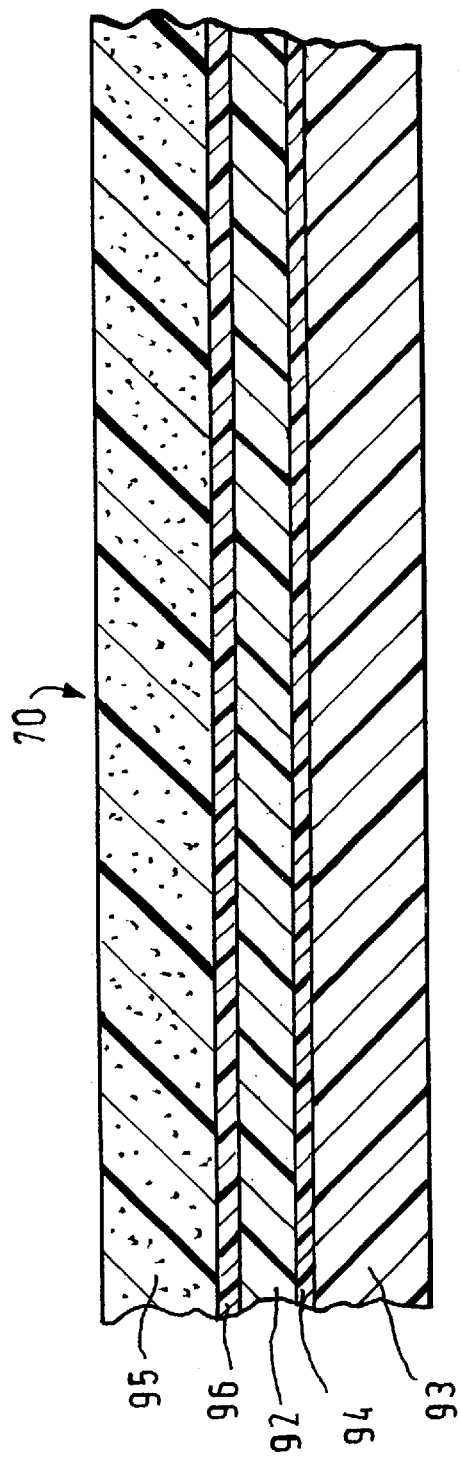
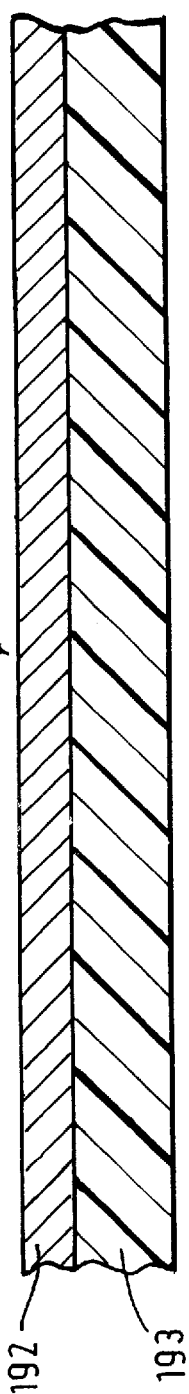
FIG. 4
FIG. 5

FUEL TANK SYSTEM FOR A MOTOR VEHICLE

FIELD OF THE INVENTION

The invention concerns a fuel tank system for a motor vehicle.

BACKGROUND OF THE INVENTION

Fuel tank systems in motor vehicles are being subjected to constantly increasingly strict requirements in terms of sealing integrity of the fuel tank systems, in order to at least reduce the amount of gaseous hydrocarbons which is given off to the ambient atmosphere, either while the vehicle is moving or while the vehicle is stationary. Considerable progress has been achieved in this respect in recent years, insofar as the degree of permeability of even fuel tanks of thermoplastic material has been reduced, either by suitable treatment such as fluorination or by virtue of the tank wall being made up of a suitable structure, to such a degree that the amounts of fuel which pass into the ambient atmosphere by diffusion through the tank wall are extremely small. Thus, in regard to making the requirements in terms of sealing integrity of the entire fuel tank system ever more strict, the important consideration will essentially be that of reducing the amount of fuel which escapes in a gaseous condition through leaks or points which lack sealing integrity, for example at joints, unions, connections, closed openings in the tank wall, ducting means passing through the tank wall and closure means, and at valves. Those leakage points admittedly occur only to such an extent that they are effectively technically unavoidable and in commercial terms are not significant at all so that they could be disregarded if the situation did not involve reducing hydrocarbon-originating environmental pollution to an even greater degree than has hitherto already been the case. The above-mentioned points at which sealing integrity is lacking are connections, unions and so forth which are not disposed in the interior of the tank itself, as leakage points which occur there, for example at the connection of the pipe with which the engine of the motor vehicle is supplied with fuel to the fuel pump which is within the tank, cannot have any adverse effects because the gaseous hydrocarbons in the tank, under normal operating conditions, are passed as a component of a gas mixture through a filter which is generally in the form of an activated carbon filter, and they are adsorbed by the adsorbent in the filter.

SUMMARY OF THE INVENTION

An object of the present invention is to provide a fuel tank system which can afford a noticeable reduction in the amount of hydrocarbons discharged to the ambient atmosphere per unit of time.

Another object of the present invention is to provide a fuel tank system which is designed to reduce the escape of gaseous hydrocarbons through leakage points on the tank or on the exterior of the tank.

Still another object of the present invention is to provide a motor vehicle fuel tank system having at least one tank produced in one piece from plastic material using an extrusion blow-molding procedure wish components mounted to the exterior thereof, such that significant leakage of gaseous hydrocarbons at the mounting points of such components to the ambient atmosphere can be at least significantly reduced.

In accordance with the principles of the present invention the foregoing and other objects are attained by a tank system, more particularly for a motor vehicle, comprising at least one fuel tank, at least one connection means and/or at least one connecting conduit and/or at least one opening which is provided in the tank wall and which is closed by a closure means, and/or at least one ducting means which passes through the tank wall and/or through the closure means. The system further includes at least one cover means which is gas-tightly mounted on the outside to at least one region of the tank. The cover means, with the tank wall, defines a space which is closed off or screened with respect to the ambient atmosphere. Disposed within the space are the at least one connection means and/or at least one connecting union and/or at least one opening closed by the closure means and/or at least one ducting means passing through the tank wall and/or through the closure means.

As will become particularly apparent from the description hereinafter of preferred embodiments of the invention, the tank system according to the invention is particularly suitable for use in relation to fuel tanks which are produced in one piece, generally by an extrusion blow-molding procedure.

Because the fuel tank is produced in one piece, the interior of the tank is not unlimitedly accessible so that those components of the tank system at which joints, unions, connections, ducting means and so forth are required cannot always be arranged in the interior of the tank in the same way as would be easily possible in relation to tanks which comprise a plurality of parts and which are subsequently assembled to form the finished tank, for example by means of welding, adhesive or in some other joining procedure. It will be noted however that tanks made up of a plurality of parts, comprising plastic materials or other materials, are also provided for example with connections, openings permanently closed by suitable closure means such as covers, and so forth. The design configuration and structure of such multi-part tanks is also such that the tanks suffer from the above-discussed minor leakage points, so that using the teaching in accordance with the invention in relation also to such tanks can afford a reduction in the amount of fuel which is discharged in gaseous form to the ambient atmosphere.

It will be appreciated however that, by virtue of the simple procedure involved in manufacturing and configuring plastic tanks, such tanks appear to be particularly advantageous in terms of using the invention in relation thereto, as for example it is possible, without incurring additional expenditure, to shape the tank wall at a suitable location or possibly also at a plurality of locations in such a way as to provide a depression or a region which is delimited in some other fashion, for example by at least one projection portion extending on the outside wall surface of the tank. The depression or the region within the above-mentioned projection together with the cover means thereover defines the space which is closed off with respect to the ambient atmosphere and within which it is therefore possible to arrange those parts and regions which are critical in terms of the escape of hydrocarbons to the atmosphere and which are therefore to be screened off relative to the ambient atmosphere. It will be further appreciated that the provision of such depressions or recess configurations in the wall of the tank does not necessarily have to result in a reduction in the usable volume of the tank, as the ways in which plastic tanks can be shaped, as already referred to above, mean that the volume of the tank can possibly be increased at another location by virtue of adopting a suitable configuration for the tank wall, in order thereby to compensate for the reduction in volume initially caused by the provision of the recess or depression in the tank wall. Or the other hand however it is also to be borne in mind that the fact that the above-mentioned critical components such as unions, connections and the like can be arranged in the interior of tanks which are not made in one piece also results in a certain reduction in the usable internal volume of such a tank, unless the volume of the tank is increased at some other location in order to compensate for that volume reduction.

It will further be noted from the description hereinafter of preferred embodiments of the invention that a particular advantage which the invention achieves is that the desired result can be attained using simple means which only involve at most a minor increase in complication and expenditure. It has already been stated above that certain requirements in regard to the shaping of the tank wall do not entail any additional complication or expenditure, in particular when using an extrusion blow-molding procedure. The cover means which are required to provide the screening effect in relation to ambient atmosphere can also be produced in a simple fashion from comparatively inexpensive materials, for example an inexpensive plastic material The further requirement which is possibly to be taken into consideration, namely that the cover means must be substantially resistant to diffusion of hydrocarbons therethrough, can be attained in a simple manner, for example if the cover means, in the form of a plastic material plate or the like, is lined with an impermeable film or sheet of metal or other impermeable material, or alternatively the plastic material plate forming the cover means may be of a multi-layer or laminate configuration, wherein a layer which is at least substantially impermeable for hydrocarbons acts as a barrier layer. The cover means can also be fixed to the tank wall in a simple manner, for example by welding, if the materials forming the tank wail and the cover means are compatible, or also by adhesive or by means of some other suitable procedure.

Further objects, features and advantages of the invention will be apparent from the description hereinafter of preferred embodiments of the invention.

BRIEF DESCRIPTION OF THE DRAWING

FIG. 2 is a view in section taken along line II—II in FIG. 1, FIG. 3 is a view corresponding to FIG. 2 but with the cover means mounted to the tank, FIG. 4 is a view in cross-section through a first embodiment of the structure of the cover means, and FIG. 5 is a view in cross-section through a second embodiment of the structure of the cover means.

DESCRIPTION OF PREFERRED EMBODIMENTS

Figure 1:
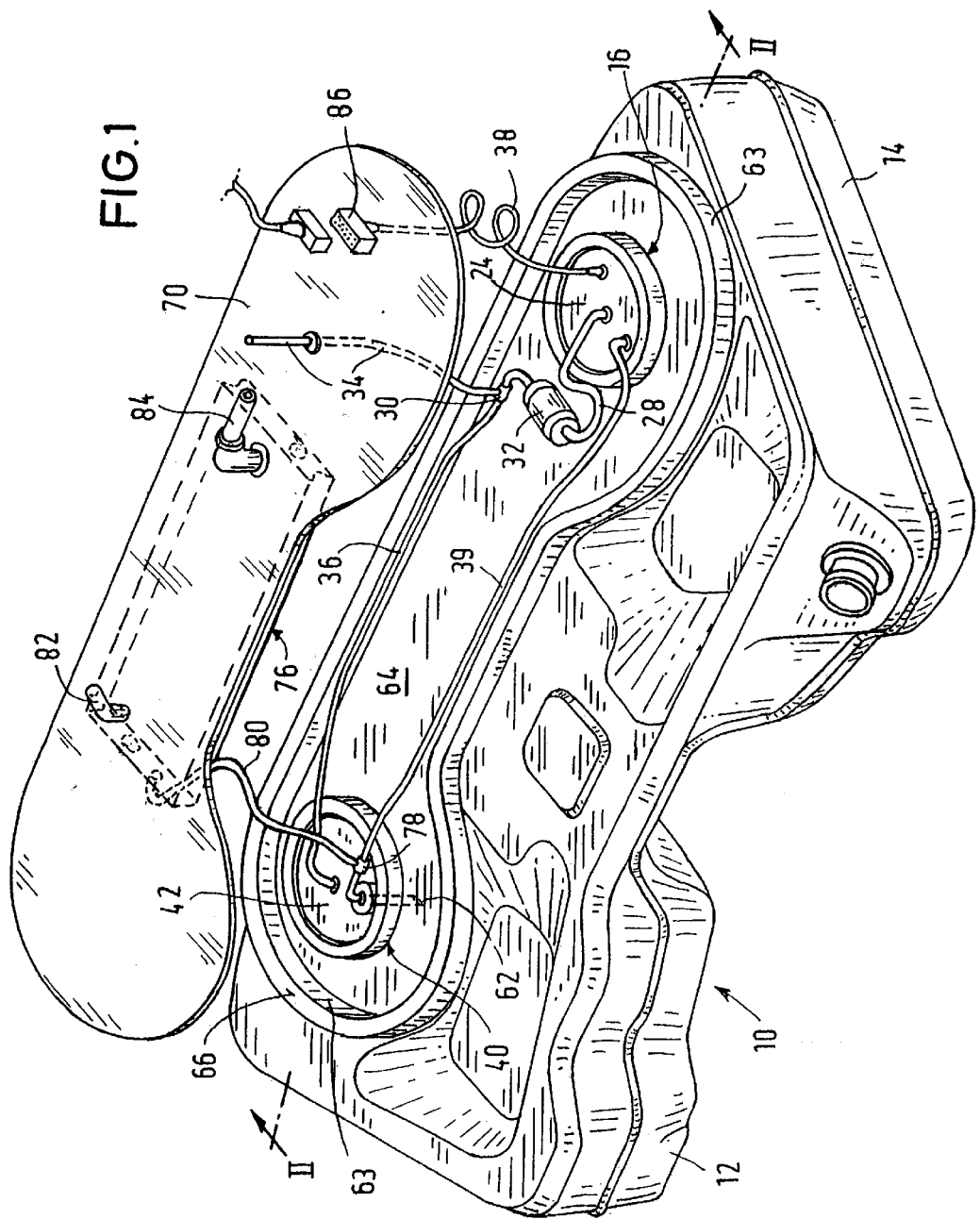
FIG. 1 is a perspective view of a tank system for a motor vehicle, in accordance with the invention, showing the cover means of the tan system at a spacing from the actual tank.

Referring firstly to FIGS. 1 through 3, shown therein is an embodiment of a tank system in accordance with the invention, for a motor vehicle, which has at least one tank indicated generally at 10, in the form of a tank structure generally referred to as a saddle tank. In such a tank, first and second tank regions 12, 14 of relatively large cross-section are connected together by an intermediate region indicated at 15 in FIGS. 2 and 3, of smaller cross-section. The tank 10 is produced in one piece from plastic material by an extrusion blow-molding process.

It will be noted at this point however that, although the teaching in accordance with the present invention is described herein by means of the specific embodiments in connection with a one-piece tank made from plastic material by extrusion blow-molding, the teaching of the invention can be used irrespective of the material from which the tank is made and irrespective of the specific configuration and the method of manufacturing the tank.

Looking now generally at FIGS. 1 through 3, the region 14 of the tank 10, which is shown at the right in these respective Figures of the drawing, is provided on its top side with an opening 16 which is possibly subsequently formed in the tank wall by a suitable procedure such as a cutting procedure or the like. A prepared delivery unit 18 can be fitted into the interior of the tank 10 through the opening 16. The delivery unit 18 has a reservoir or swirl pot 20 for fuel. Disposed within the reservoir 20 is a fuel pump (not shown) by means of which the engine of the motor vehicle can be supplied with fuel. The delivery unit 18 is also provide with a pick-up or sender 22 which is mounted to the reservoir 20 and which indicates the respective amount of fuel contained in the tank 10. After the delivery unit 18 has been fitted into the tank 10 and after a conduit connection has been made with the region 12, in a manner to be described hereinafter, the opening 16 is closed by a suitable closure means which for example is in the form of a cover member indicated at 24 in the drawing. For that purpose, in the region of the opening 16, the wall of the tank 10 can be provided with a connecting portion or rim portion 26 or the like which extends around the opening 16, as indicated for example in FIG. 2. The cover member 24 is mounted to the rim portion 26 using suitable connecting means, for example a cap nut. The sealing action between the cover member 24 and the tank wall or rim portion 26 is provided by a suitable sealing ring. All these design configurations and arrangements are matters which are familiar to the man skilled in the art and which for that reason do not need to be described in further detail herein.

Reference numeral 28 in the drawing denotes a feed flow conduit or line which is passed through the cover member 24 closing the opening 16. At its one end, the conduit 28 is connected within the delivery unit 18 to the fuel pump or gasoline pump disposed therein while at its other end which is outside the tank 10, the conduit 28 is connected to a T-member 30. Disposed in the conduit 28 between the fuel pump and the T-member 30 is a fuel filter 32 which is also disposed outside the tank 10 and through which the fuel passes to the T-member 30, to the one outlet of which is connected a fuel conduit or line 34 leading to the engine of the motor vehicle. Connected to the second outlet of the T-member 30 is a conduit or line 36 through which the proportion of fuel which is delivered by the pump in the tank 10, that is not required by the engine for operation thereof, is returned back into the tank 10, more specifically into the region 12 thereof. In normal operation of the motor vehicle therefore the fuel pump delivers more fuel than is actually needed by the engine for operation thereof.

Reference numeral 38 in the drawing denotes an electrical line which is also passed through the cover member 24 closing the opening 16. The line 38 includes a plurality of electrical conductors of which for example one serves to transmit the signals produced by the sender 22 for sensing the level of fuel in the tank and which are suitably displayed for example on a display instrument on the instrument panel of the motor vehicle. Further conductors of the line 38 serve to provide for the supply of power to the electric fuel pump in the delivery unit 18.

Finally, also passing through the cover member 24 is a vent conduit or line 39 which serves to vent the fuel tank by an intake of air while fuel is being drawn therefrom for operation of the motor vehicle engine.

It will be appreciated that on the one hand the opening 16 is closed by the cover member 24 and on the other hand the feed flow conduit 28, the vent line 39 and the electrical line 38 are passed through the cover member 24, in such a way that the closure action afforded by the cover member 24, and the way in which the lines 28, 39 and 38 are passed through the cover member 24, involve at least virtually total fluid-tight sealing integrity. It will be appreciated in addition however that it is inevitable that certain minimal leakage effects occur, as a result of which hydrocarbons in a gaseous condition can pass into the ambient atmosphere from the tank 10. That also applies in regard to junctions or unions between the feed flow conduit 28 and the fuel filter 32 and the unions at the T-member 30 which are all outside the tank 10.

The region 12 of the tank 10, which is shown at the left in FIGS. 1 through 3 of the drawing, is also provided in the upper tank wall with an opening 40 through which the interior of the tank 10 is accessible for assembly of the tank system. The opening 40 is closed by a cover member indicated at 42, through which the line 36 coming from the T-member 30 is passed in fluid-tight relationship into the interior of the region 12 of the tank 10. In this case also, as in the case of the opening 16 associated with the region 14 of the tank, the tank wall may carry a connecting portion or rim portion as indicated at 44, on which the cover member 42 is suitably held, for example by a bayonet locking device, a cap nut or in some other fashion. Incorporated into the return line 36, within the region 12 of the tank 10, is a pressure-maintaining valve which is indicated at 46 in FIGS. 2 and 3 and which opens only at a given minimum pressure, in order thereby to ensure that a sufficient amount of fuel always flows through the line 34 to the motor vehicle engine.

Reference numeral 48 in FIGS. 2 and 3 denotes a portion of the return line 36, which is disposed downstream of the pressure-holding valve 46 as considered in the direction of flow therethrough. The portion 48 is extended to a position closely above the bottom 50 of the region 12 of the tank 10, where it terminates in a horizontal portion, the outlet opening of which is in the form of a drive nozzle 52 of a suction jet pump 54 whose receiving or catch nozzle 56 is continued into a conduit portion 58. The conduit portion 58 communicates with the reservoir 20 of the delivery unit 18, within the tank 10, passing through the region 15 of the tank 10 which is of smaller cross-section and which is between the regions 12 and 14 of the tank. The purpose of the suction jet pump 52 which is driven by the return flow of fuel constituted by the excess amount thereof that is returned from the engine is essentially to ensure that the fuel in the region 12 of the tank 10 also goes to the fuel pump in the reservoir or swirl pot 20. The opening 40 therefore essentially serves to introduce the pressure-holding valve 46, the line portion 48, the suction jet pump 54 and the line portion 58 into the tank and suitably fix those components therein.

Besides the return line 36, a vent line 60 is also passed through the cover member 42, as in the case of the cover member 24 which closes the opening 16 in the region 14 of the tank 10. The line 60 serves to vent the tank during filling thereof. The position of the opening 62 at the lower end of the vent line 60 determines the maximum filling volume of the tank. When, in the operation of filling the tank, the fuel rising in the tank closes the intake opening 62 of the vent line 60, no further gas mixture can issue from the space above the level of the fuel. Due to the rise in pressure which is produced in that way in the tank 10, the tank-filling operation is interrupted, by for example shutting off the gas pump nozzle which is introduced into the tank filling opening.

As in the case of the opening 16 which is closed by the cover member 24, there is in this case also the risk of leakage points for gaseous hydrocarbons occurring at the sealing location between the cover member 42 and the adjoining wall portion of the tank or the rim portion 44 and at the two passage locations where the lines 36 and 40 pass through the cover member 42.

Reference will now be made in particular to FIG. 1 showing that, at the top side of the tank at which the two openings 16 and 40 are provided, the tank 10 is provided on its outside with a projection 63 in the form of a raised bar or strip portion which extends on the outside wall surface of the tank around the two openings 16 and 40 in the configuration that can be clearly seen from FIG. 1. The projection 63 thus defines a region 64 on the top wall surface of the tank 10, wherein the two closable openings 16, 40 and thus the above-mentioned closure means, and passage locations at which the various conduits or lines 28, 38, 36 and so forth pass through the closure means are arranged, being locations at which there is a danger of gaseous hydrocarbons being able to escape from the interior of the tank 10 if there are any points lacking sealing integrity in that area. In this connection, reference numeral 66 denotes the top surface of the projection 63. It will be seen that, in the illustrated embodiment, the height of the projection 63 whose top surface 66 extends in one plane is so selected that all parts which project upwardly in the region 64 with respect to the upper wall 68 of the tank 10 are disposed beneath the top surface 66 of the projection 63. That configuration makes it possible for the space which is delimited at the sides thereof by the projection 63 and which is delimited at its underside by the top wall surface 68 of the tank 10 to be closed by a flat, plate-shaped cover 70, the shape of which corresponds to the configuration in plan view of the region 64 bordered by the projection 63, in such a way that the edge region of the cover plate 70 rests on the top surface 66 of the projection 63.

Looking now at FIG. 3, the cover 70 is shown therein in its operative position in which it is joined to the projection 63 by suitable means such as welding, adhesive or the like. The projection 63 and the cover 70 thus define a chamber or space 74 which is gas-tightly closed off or screened relative to the ambient atmosphere, apart from a few passages through the cover plate 70, which are still to be described hereinafter. The fuel filter 32 and the T-members 30 and 78 are also arranged in the space 74, apart from the two openings 16 and 40 which are each closed by a respective cover member and the passages through the respective covers 24 and 42, so that the unions and connections associated with the fuel filter 32 and the T-members 30 and 78 are also disposed within the space 74.

It will be appreciated that it is desirable for the cover plate 70 to be made from a material or to be covered with a material which is impermeable to hydrocarbons. In that respect, it would readily be possible for the edge region possibly to be left uncovered or exposed, so as to afford good conditions for producing a welded connection which naturally requires suitable compatibility in respect of the two materials involved, that is to say the material of the tank 10 and the material of the cover plate 70.

The cover plate 70 is provided at its underside with a housing 76 which is of substantially rectangular configuration and which is filled with activated carbon serving as an adsorbent for hydrocarbons. The vertical extent of the housing 76 is such that, when the cover plate 70 is fitted on to the projection 63, the housing 76 fits into the screened space 74 and possibly still leaves space for the passage of the return line 36 and the vent line 39 which is passed through the cover member 22 on the opening 16 associated with the tank region 14. The vent line 39 is opened during operation of the motor vehicle, that is to say when fuel is being drawn from the tank 10 for operation of the motor vehicle engine, in order to vent the tank 10 by allowing the introduction of air into same, thereby to prevent the occurrence of a reduced pressure in the tank. At its end remote from the cover member 24, the line 39 is connected to a T-member 78 whose other access is connected to the vent line 60 which serves to vent the fuel tank during filling thereof with fuel. Connected to the outlet connection of the T-member 78 is one end of a line 80 whose other end communicates with the housing 76 of the activated carbon filter. The connection of the line 80 to the activated carbon filter is also within the space 74 which is closed off with respect to the external ambient atmosphere.

The activated carbon filter is provided with two outlets 82 and 84 of which one makes a communication with the ambient atmosphere.

Connected into the vent line 39 and the vent line 60 are respective valves (not shown) in order that those two lines can be connected selectively by way of the line 80 to the activated carbon filter. When the tank 10 is being filled with fuel, the valve in the vent line 39 is closed so that the gas mixture issuing from the tank during the tank-filling operation passes by way of the lines 60 and 80 into the activated carbon filter in which the hydrocarbons contained in the gas mixture are adsorbed. The air which is purified in that way passes through the line 84 into the atmosphere. The two valves referred to above, with their connections, can also be arranged within the space 74.

In normal operation of the motor vehicle, the vent line 60 is closed so that air is passed into the filter 76 through the line 84 which provides the communication with the atmosphere, and is taken from the filter 76 by way of the discharge line 82 as combustion air, being passed to the engine of the motor vehicle. A part of the air flowing through the filter 76 is passed into the tank through the lines 80 and 39. When that happens, the air flowing through the filter desorbs the hydrocarbons which are on the surfaces of the activated carbon or another suitable adsorbent and which, insofar as they do not pass into the tank, are burnt in the engine.

When the teaching in accordance with the invention is carried into effect in relation to a tank, it may also be possible for the closure means for closing the two openings 16 and 40, being illustrated in the form of the cover members 24 and 42, to be of a somewhat less complicated and expensive nature than is the case with known tanks in which gaseous hydrocarbons passing through any leakage points can pass directly into the ambient atmosphere. The presence of the cover plate 70 in the tank system according to the invention means that any leakage at such locations is much less critical than in the previous tanks. Thus for example it is possible to use less expensive seals for sealing off the respective cover member 24 or 42 with respect to the adjoining part of the tank wall. A corresponding consideration also applies in regard to the means used to afford the greatest possible degree of sealing integrity for the locations at which the various lines, conduits and the like pass through the two cover members 24 and 42.

As no hydrocarbon-bearing gases can issue from the two openings 82 and 84 of the filter contained in the housing 76, by virtue of the presence of the adsorbents at that location, the use of the teaching in accordance with the invention means that there are only two direct passages through the cover plate 70, more specifically on the one hand the location at which the line 34 leading to the motor vehicle engine passes through the cover plate 70, and on the other hard the location at which the electrical line 38 passes through the cover plate 70. Reference numeral 86 identifies a plug connecting member at the end of the line 38. It will be noted that, if those two passage points through the cover plate 70 have slight leakage, very much less hydrocarbons can issue through those two passage points into the outside ambient atmosphere, than the amount which can escape through all of the passages, connecting locations and so forth which are to be found within the space 74 defined in the recess afforded by the raised projection 63.

It will be clearly seen from the drawing that use of the invention makes it possible for all closed tank openings and all connections end unions of the various lines and conduits and connections to functional parts, for example on the fuel filter 32 and appropriate valves, to be disposed in the space 76 which is practically gas-tightly closed off with respect to the ambient atmosphere.

FIG. 2 of the drawing further shows that the projection 63 is in the form of a hollow bar portion formed by first and second limbs 65 and 67 and a web portion 73 connecting the limbs 65 and 67. The two limbs 65, 67 and the web portion 73 define a hollow space 72 within the projection 63. The space 72 in the projection 63 is in communication with the internal volume of the tank 10. As a result, if the inside surface of the tank wall is suitably treated, for example by fluorination, the inside surfaces of the projection 63 are also correspondingly fluorinated, with the consequence of producing a corresponding reduction in the permeability of those wall portions for hydrocarbons which are in the region of the space 74.

It would also be possible for the wall of the tank 10 to comprise a plurality of layers of which at least one is in the form of a barrier layer. In that case, the projection 63 would also be impermeable to hydrocarbons, more specifically, even if the projection 63 were not hollow but were solid. At any event, the web portion 73 which forms the upper boundary surface 66 of the projection 63 is of such an extent, perpendicularly to the two limbs 65 and 67, that a possible absence of a diffusion barrier effect here would not be significant. The tank system according to the invention therefore has only two passages, more specifically that for the fuel feed line 34 and that for the electrical line 38, at which only minimal leakages can occur.

As a departure from the specific embodiment described hereinbefore nad illustrated in the drawing, the arrangement of the fuel tank system according to the invention may also be such that the cover plate 70 is profiled in such a way that, for example at locations at which any components or the like project upwardly beyond the top face 66 of the projection 63, the cover plate 70 is provided with a suitable recess to form an increase in the volume afforded by the space 74. The cover 70 may thus be in the form of a cap which is connected to the tank wall and which projects at least partially outwardly in relation thereto. It is however also possible for the space 74 which is shielded relative to the ambient atmosphere by a cover means to be arranged in a depression in the tank so that the space 74 does not project with respect to the external contour of the tank 10, or so that only parts of the space 74 project with respect to the external contour of the tank 10. Which of the many options that present themselves is actually adopted essentially depends on the configuration of the tank and the space available at the location at which the tank is fitted in a motor vehicle.

The cover plate 70 at any event can be profiled to achieve adequate stiffness.

Moreover it may be desirable for the housing 76 which accommodates the filter adsorbent to be provided with small openings or the like as indicated at 90 in FIG. 1, for providing for equalisation of pressure between the interior of the housing 76 and the space 74 surrounding it. That can result in a certain interchange effect between the gases in the regions of the space 74 surrounding the housing 76, and the filter, with the result that hydrocarbons which accumulate in the space 74 are adsorbed by the adsorbent in the filter at any event to such an extent as to avoid the occurrence of a concentration of hydrocarbons in the space 74, so that in practice no hydrocarbons could escape to the exterior even if the cover plate 70 and the projection 63 which represents the side wall of the space 74 were not impermeable to hydrocarbons.

Reference will now be made to FIG. 4 showing a view in section through a cover plate 70 which is in the form of a laminate, comprising a plurality of layers of which the central layer indicated at 92 is in the form of a barrier layer affording no permeability, or only a very low level of permeability, in respect of hydrocarbons. The side which is to be connected to the projection 63 is formed by a layer 93 of HDPE. The tank is generally also produced from that material so that the cover plate 70 can be readily welded to the end face 66 of the projection 63 in order to produce a sealed connection therebetween. The barrier layer 92 is joined to the HDPE layer 93 by way of an adhesive or bonding layer 94. The upper layer 95 of the laminate structure can comprise recycled waste material which has the materials of all layers of the cover plate 70. The layer 95 is joined to the barrier layer 92 by way of a second adhesive or bonding layer 96. It will be appreciated that, in place of the waste material for the layer 95, it is also possible to use HDPE. The laminate forming the cover plate 70 may be of the same structure as the wall of the tank 10, although that is not necessarily the case.

looking now at FIG. 5, shown therein is a second embodiment of a cover plate 170 comprising a plastic material layer 193 which is lined on the side thereof which is the upward side in FIG. 5, with a metal sheet or film 192 which is impermeable in respect of hydrocarbons. The metal sheet 192 can comprise for example aluminum. In this case also the join between the cover plate 170 and the projection 63 to which it is suitably fitted can be made by welding if the materials of the projection 63 on the one hand and the layer 193 on the other hand are mutually compatible.

It will be noted that the thicknesses of the respective layers or metal sheet are not shown to scale in FIGS. 4 and 5.

It will be appreciated that the above-described embodiments of the invention have been set forth solely by way of example and illustration of the invention and that various other modifications and alterations may be made therein without thereby departing from the spirit and scope of the invention.

What is claimed is:

1. A tank system for a motor vehicle, including:
   at least one fuel tank produced from thermoplastic material by an extrusion blow molding process;
   at least one feature selected from the group consisting of at least one connection, at least one connecting conduit, at least one opening provided in the tank wall and closed by a closure, and at least one passage through at least one of the tank wall and the closure, and
   at least one cover that is substantially diffusion-resistant to hydrocarbons and is gas-tightly mounted on the outside to at least one region of the tank, the cover with the tank wall defining a space which is screened with respect to the ambient atmosphere and within which is arranged said at least one feature selected from said connection, said connecting conduit, said opening, and said passage;
   wherein the cover comprises a material weldable to the material forming the tank wall.

2. A tank system as set forth in claim 1 wherein the tank wall has at least one recess portion forming the at least one screened space, said recess portion being closed by said cover.

3. A tank system as set forth in claim 2 wherein the cover is in the form of a substantially flat plate which is substantially aligned with the regions of the tank wall adjoining the recess portion.

4. A tank system as set forth in claim 1 wherein the screened space is formed by a hollow body which is fitted externally on to the tank wall.

5. A tank system as set forth in claim 4 wherein the cover is in the form of a cap connected to the tank wall in at least partially outwardly projecting relationship with respect to the tank wall.

6. A tank system as set forth in claim 4 wherein the tank wall has a depression and the hollow body is at least partially received by the depression in the tank wall.

7. A tank system as set forth in claim 1 wherein the cover is profiled to achieve increased stiffness.

8. A tank system as set forth in claim 1 wherein at least a portion of the screened space is filled with filter material which serves for the adsorption of hydrocarbons.

9. A tank system as set forth in claim 1 including means for venting the screened space, and
   a filter operatively communicating with the screened space for receiving the gas mixture discharged from the space to at least partially adsorb the hydrocarbons of said mixture.

10. A tank system as set forth in claim 1 wherein said cover comprises a plurality of layers, a first of said layers being at least substantially impermeable to hydrocarbons.

11. A tank system as set forth in claim 1 wherein said cover is provided with a sheet of material which is impermeable to hydrocarbons.

12. A tank system for a motor vehicle, including:
    at least one fuel tank produced from thermoplastic material by an extrusion blow molding process;
    at least one feature selected from the group consisting of at least one collection, at least one connecting conduit, at least one opening provided in the tank wall and closed by a closure, and at least one passage through at least one of the tank wall and the closure, and
    at least one cover that is substantially diffusion-resistant to hydrocarbons and is gas-tightly mounted on the outside to at least one region of the tank, the cover with the tank wall defining a space which is screened with respect to the ambient atmosphere and within which is arranged said at least one feature selected from said connection, said connecting conduit, said opening, and said passage;

wherein the tank wall has at least one external projection thereon defining the at least one screened space and said cover covers over the tank wall region defined by the projection.

13. A tank system as set forth in claim 12 wherein said projection is impermeable to hydrocarbons.

14. A tank system for a motor vehicle, including:

at least one fuel tank produced from thermoplastic material by an extrusion blow molding process;

at least one feature selected from the group consisting of at least one connection, at least one connecting conduit, at least one opening provided in the tank wall and closed by a closure, and at least one passage through at least one of the tank wall and the closure;

at least one cover that is substantially diffusion-resistant to hydrocarbons and is gas-tightly mounted on the outside to at least one region of the tank, the cover with the tank wall defining a space which is screened with respect to the ambient atmosphere and within which is arranged said at least one feature selected from said connection, said connecting conduit, said opening, and said passage; and at least one filter for adsorbing hydrocarbons.

15. A tank system as set forth in claim 14 wherein the at least one filter is arranged within the screened space.

16. A tank system as set forth in claim 14 and further including a housing carried by the cover, wherein the filter material is arranged within the housing on the cover.

17. A tank system as set forth in claim 16 wherein the housing is connected to the cover.

18. A tank system as set forth in claim 16 wherein the housing forms part of the cover.

* * * * *